United States Patent
Sasahara et al.

(10) Patent No.: US 10,096,128 B2
(45) Date of Patent: Oct. 9, 2018

(54) CHANGE DEGREE DERIVING DEVICE, CHANGE DEGREE DERIVING SYSTEM, AND NON-TRANSITORY COMPUTER READABLE MEDIUM

(71) Applicant: FUJI XEROX CO., LTD., Tokyo (JP)

(72) Inventors: Shinji Sasahara, Kanagawa (JP); Hitoshi Ogatsu, Kanagawa (JP); Junichi Matsunoshita, Kanagawa (JP); Ken Ogino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 54 days.

(21) Appl. No.: 15/350,885

(22) Filed: Nov. 14, 2016

(65) Prior Publication Data
US 2017/0318196 A1 Nov. 2, 2017

(30) Foreign Application Priority Data
May 2, 2016 (JP) .................................. 2016-092706

(51) Int. Cl.
G06K 9/00 (2006.01)
G06T 7/40 (2017.01)
H04N 1/60 (2006.01)
H04N 1/64 (2006.01)

(52) U.S. Cl.
CPC ............ *G06T 7/408* (2013.01); *H04N 1/6047* (2013.01); *H04N 1/646* (2013.01); *G06T 2207/10024* (2013.01); *G06T 2207/10148* (2013.01)

(58) Field of Classification Search
CPC ........... G06T 2207/10024; G06T 5/001; G06T 7/001; H04N 5/2621; H04N 5/23212; H04N 1/60; G06K 9/4652; G06K 9/4604
See application file for complete search history.

(56) References Cited

U.S. PATENT DOCUMENTS 6,160,644 A * 12/2000 Lin ....................... H04N 1/6058
358/518
2009/0040354 A1 * 2/2009 Takanashi .......... H04N 5/23212
348/308

FOREIGN PATENT DOCUMENTS

JP 2014-196926 A 10/2014

\* cited by examiner

*Primary Examiner* — Eueng-Nan Yeh
(74) *Attorney, Agent, or Firm* — Oliff PLC

(57) ABSTRACT

Provided is a change degree deriving device including a receiving unit that receives an image obtained by capturing a known color body and an object while focusing on the object, the known color body including plural of color samples, each of which has a known color numerical value, and a detection image, and a detecting unit that detects a focus deviation of the color samples in the image, based on the detection image.

7 Claims, 11 Drawing Sheets

CHANGE DEGREE DERIVING DEVICE, CHANGE DEGREE DERIVING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-092706 filed May 2, 2016.

BACKGROUND

Technical Field

The present invention relates to a change degree deriving device, a change degree deriving system, and a non-transitory computer readable medium.

SUMMARY

According to an aspect of the invention, there is provided a change degree deriving device including:

a receiving unit that receives an image obtained by capturing a known color body and an object while focusing on the object, the known color body including plural of color samples, each of which has a known color numerical value, and a detection image; and a detecting unit that detects a focus deviation of the color samples in the image, based on the detection image.

BRIEF DESCRIPTION OF THE DRAWINGS

Exemplary embodiments of the present invention will be described in detail based on the following figures, wherein:

FIGS. 6A to 6D illustrate a first example of a detection image in the exemplary embodiment of the present invention, in which FIG. 6A is an image view, and FIGS. 6B to 6D are graphs illustrating a contrast;

DETAILED DESCRIPTION

Hereinafter, an exemplary embodiment of the present invention will be described in detail with reference to drawings.

Figure 1:
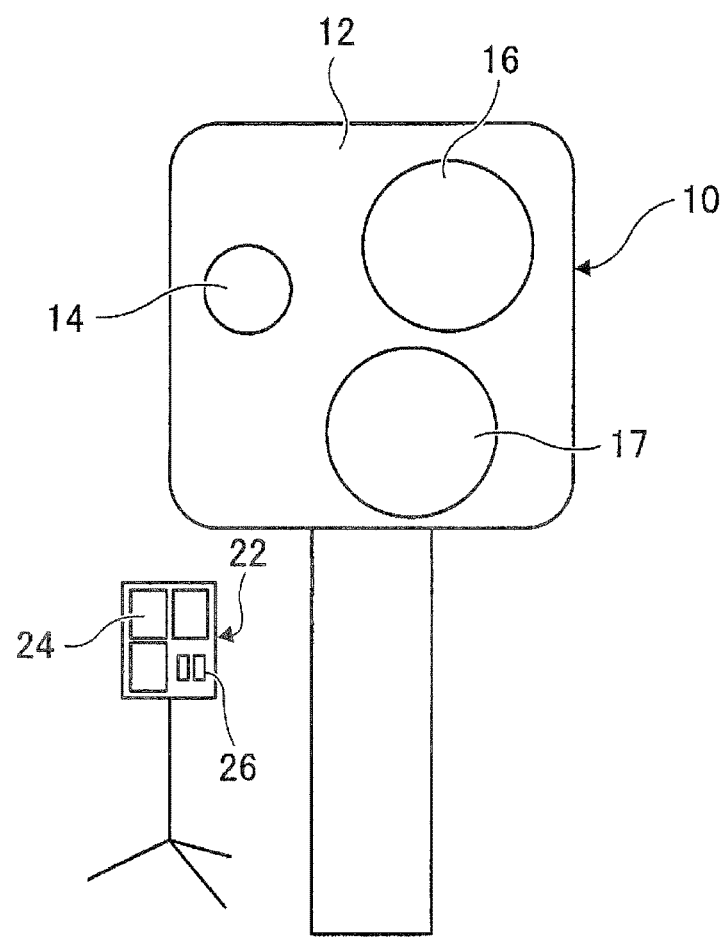
FIG. 1 is a diagram illustrating a deterioration measuring system according to an exemplary embodiment of the present invention.
Figure 1:
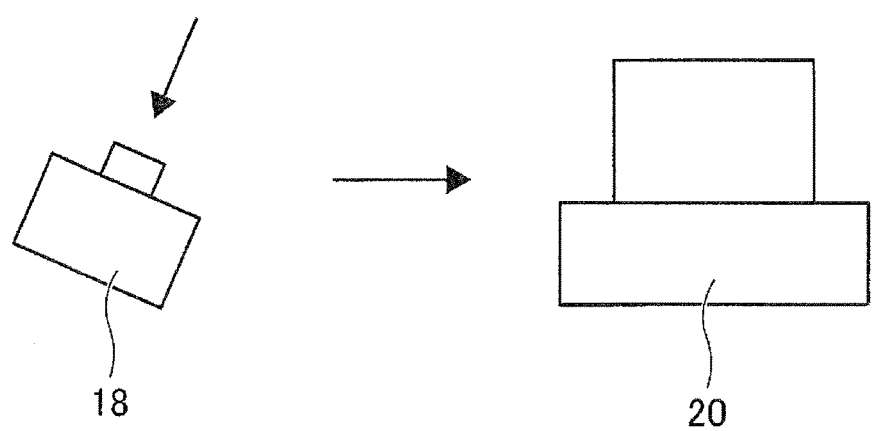

FIG. 1 is a diagram illustrating a change degree derivation according to an exemplary embodiment of the present invention. Hereinafter, descriptions will be made assuming that a deterioration of an object is measured, and the change degree derivation is replaced with a "deterioration measurement" in the description.

An object 10 for which a deterioration measurement is to be performed is, for example, a signboard, and is provided at a place where a direct measurement is difficult (such as a high place). The object 10 is formed of a translucent body, and includes, for example, a white portion 12, a red portion 14, a green portion 16, and a blue portion 17. Within the object 10, a light source such as a white LED is disposed, and light emitted from the light source is adapted to transmit through the object 10.

An image capturing device 18 is, for example, a digital camera. The image capturing device 18 may be a smart phone, a tablet PC, or the like.

A processing device 20 is, for example, a personal computer, and is configured to receive image data obtained by capturing the object 10 using the image capturing device 18, and process the image data.

Figure 2:
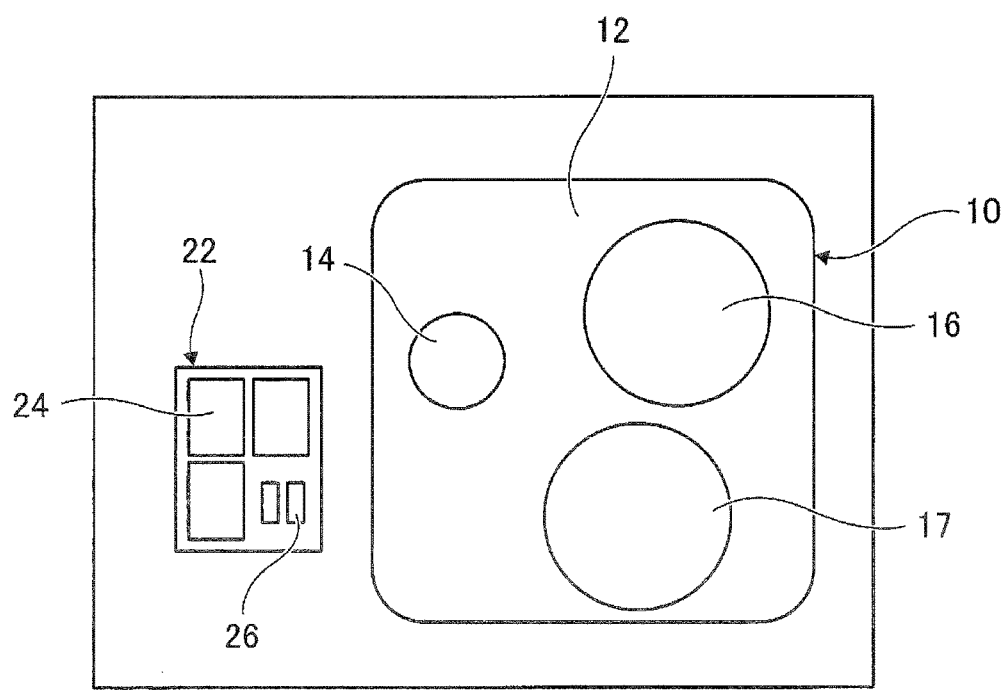
FIG. 2 is a screen view illustrating a screen to be captured by an image capturing device in the exemplary embodiment of the present invention.

A known color body 22 is provided at a place distant from the object 10 because it is difficult to attach the known color body 22 to the object 10. The known color body 22 is captured by the image capturing device 18 together with the object 10 as illustrated in FIG. 2.

In the known color body 22, plural color samples 24 are formed. The color samples 24 include R (red), G (green), and B (blue) in the exemplary embodiment, and may further include 100% solids of C (cyan), M (magenta), Y (yellow), W (white), Bk (black), and their neutral colors.

Further, on the known color body 22, a detection image 26 to be described below is formed.

Figure 3:
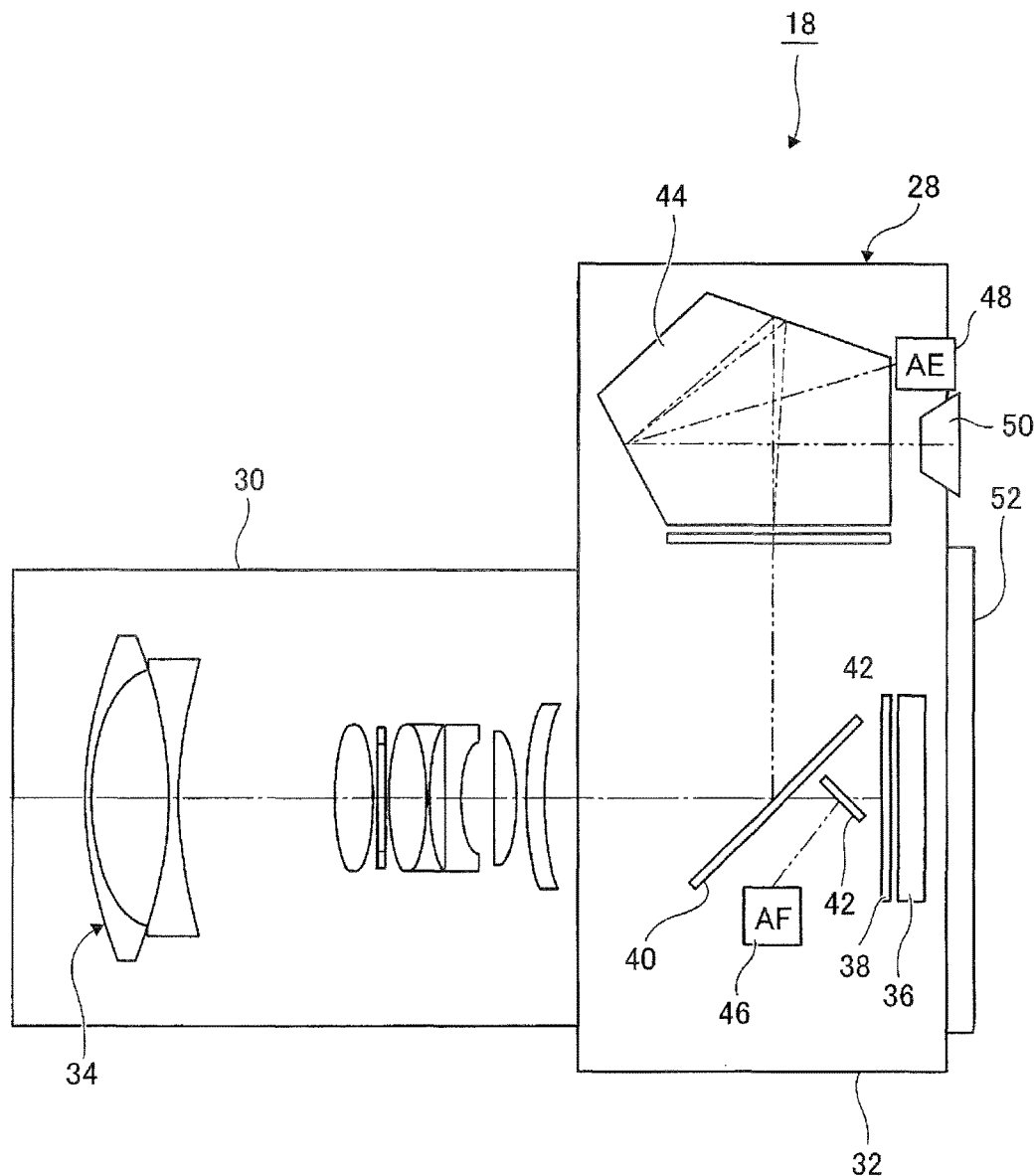
FIG. 3 is a sectional view illustrating an image capturing device in the exemplary embodiment of the present invention.

FIG. 3 is a sectional view illustrating the image capturing device 18.

The image capturing device 18 includes a casing 28. The casing 28 includes a cylindrical lens arrangement unit 30, and a rectangular body portion 32. A lens group 34 including plural lenses is arranged in the lens arrangement unit 30. An image sensor 36 that receives light entering from the lens group 34 is disposed in the body portion 32. A shutter 38 is provided at the front side of the image sensor 36, and exposure of the light received by the image sensor 36 is adjusted by driving the shutter 38.

Further, a first half mirror 40 and a second half mirror 42 are disposed in front of the shutter 38. The first half mirror 40 divides light into light directed toward the image sensor 36 and light directed toward a prism 44. The second half mirror 42 divides light into light directed toward the image sensor 36 and light directed toward an automatic focusing (AF) sensor 46.

The prism 44 is configured to supply the light divided by the first half mirror 40 to an automatic exposure (AE) sensor 48 and a viewfinder 50. Further, for example, a liquid crystal-type display 52 is provided below the viewfinder 50.

Figure 4:
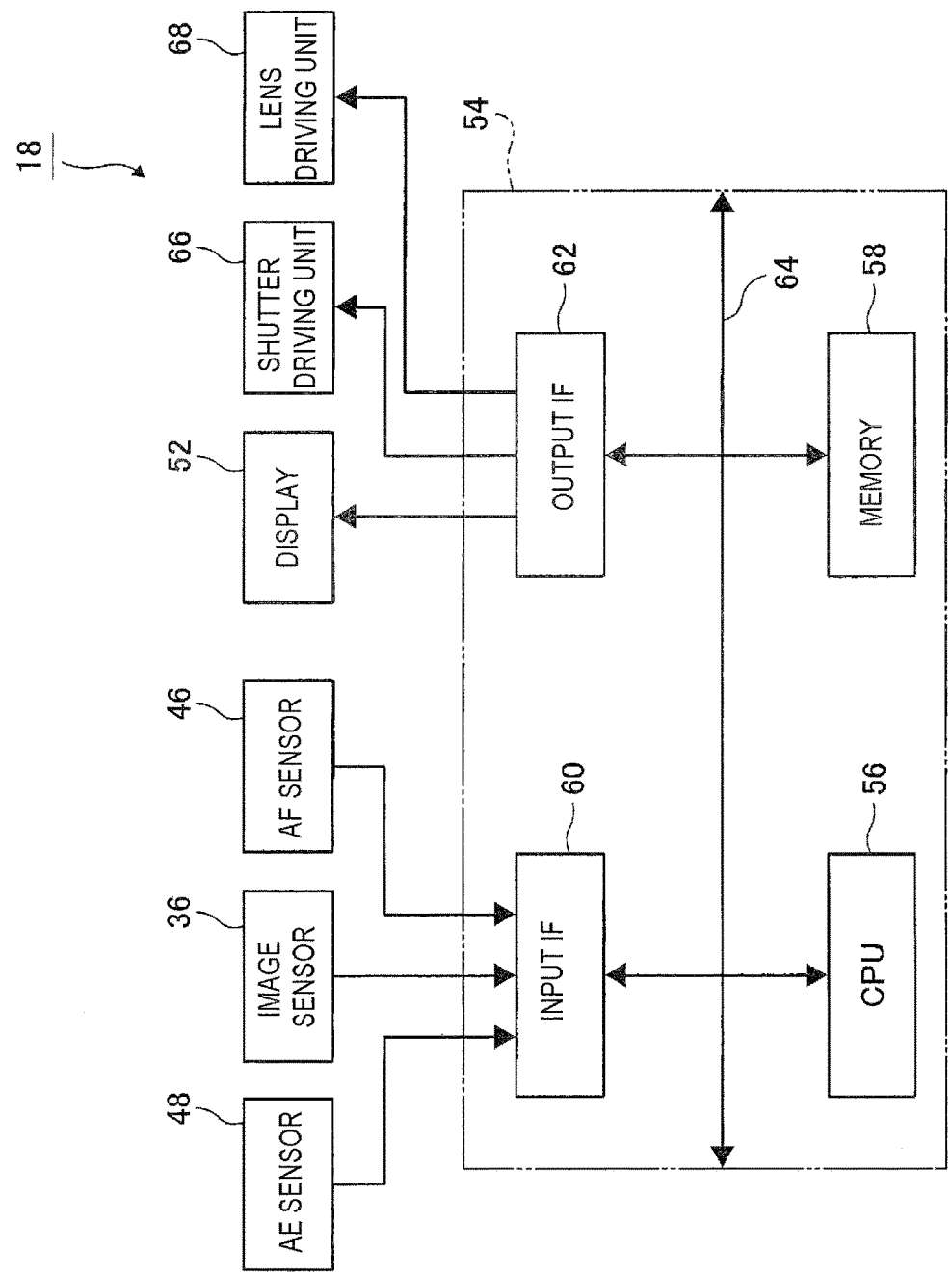
FIG. 4 is a block diagram illustrating hardware of the image capturing device in the exemplary embodiment of the present invention.

FIG. 4 is a block diagram illustrating a control part of the image capturing device 18.

The image capturing device 18 includes a controller 54. The controller 54 includes a CPU 56, a memory 58, an input interface 60, and an output interface 62, which are connected through a control bus 64.

The CPU 56 executes a predetermined control based on a control program stored in the memory 58. To the input interface 60, the image sensor 36, the AF sensor 46 and the AE sensor 48 as described above are connected, and image data from these are input. The display 52, a shutter driving unit 66, and a lens driving unit 68 are connected to the output interface 62. On the display 52, an image received through light by the image sensor 36 is displayed. The shutter driving unit 66 controls the shutter 38 so that a shutter speed or an aperture stop is controlled based on the above described image data from the AE sensor 48. Further, the lens driving unit 68 drives an auto-focus lens of the lens group 34 so as to take a focus based on the above described image data from the AF sensor 46.

Figure 5:
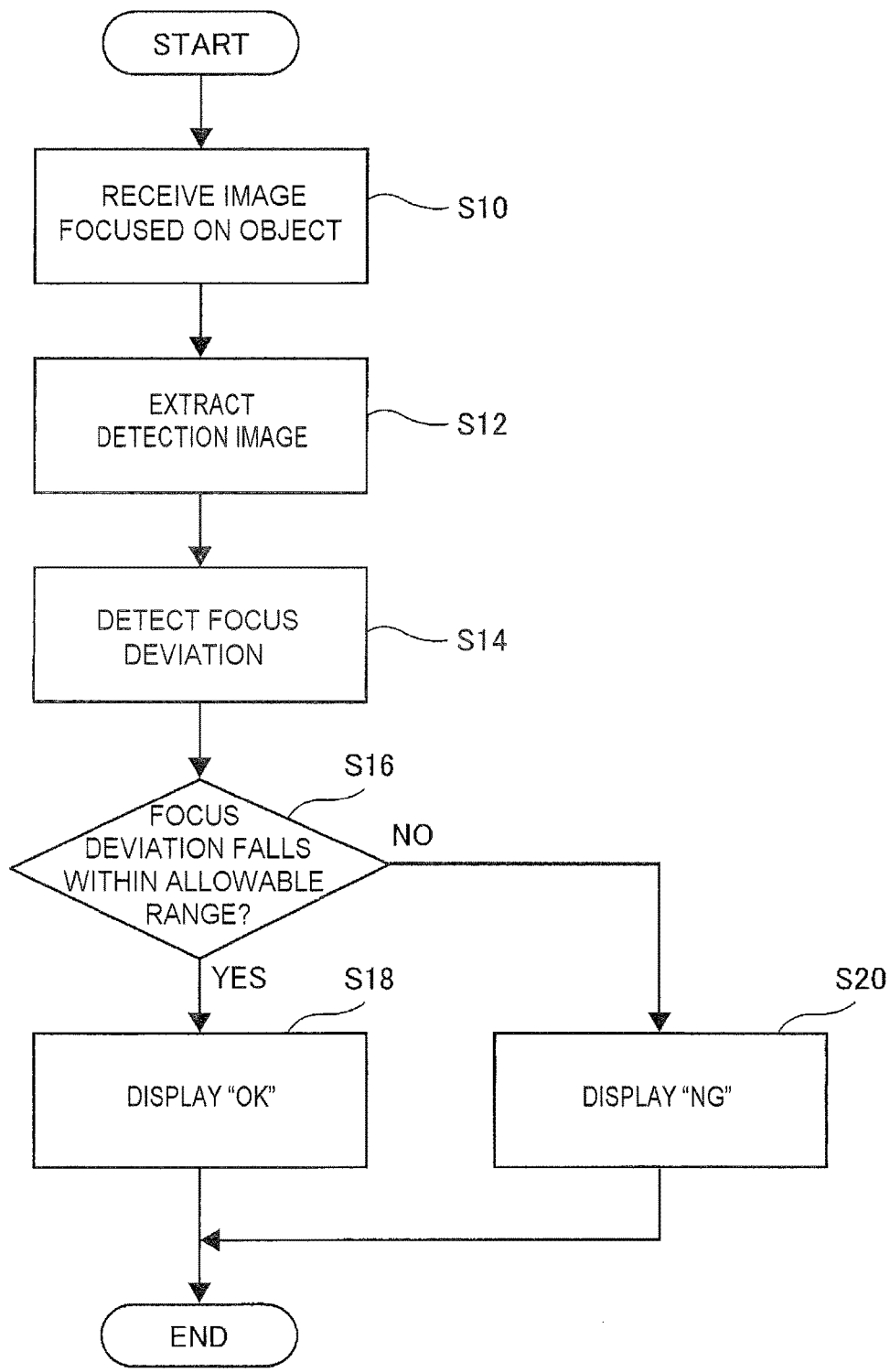
FIG. 5 is a flow chart illustrating an operation flow of the image capturing device in the exemplary embodiment of the present invention.

FIG. 5 is a flow chart illustrating an operation flow of the image capturing device 18.

First, in step S10, an image focused on the object 10 is received. That is, when the image capturing device is directed to the object 10, the AF sensor 46 is operated to take a focus on the object 10. Here, as illustrated in FIG. 2, the known color body 22 is also displayed on the display 52.

Figure 6A:
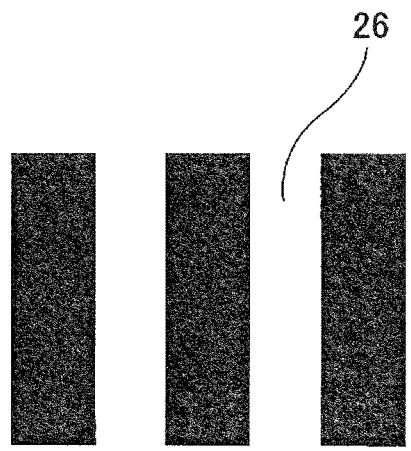

In the following step S12, the detection image 26 is extracted. The detection image 26 is formed, as illustrated in FIG. 6A, by images having a large difference in light and dark, e.g., black and white images in a continuous strip shape.

Figure 6B:
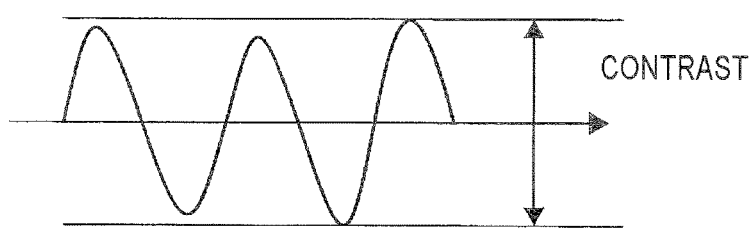

In the following step S14, a focus deviation of the known color body 22 is detected. For example, when the detection image 26 is in focus, as illustrated in FIG. 6B, the detection image 26 is taken as an image having a large contrast. However, when the object 10 is in focus, a focus deviation is caused and the contrast is reduced because the known color body 22 is distant from the object 10.

Figure 7:
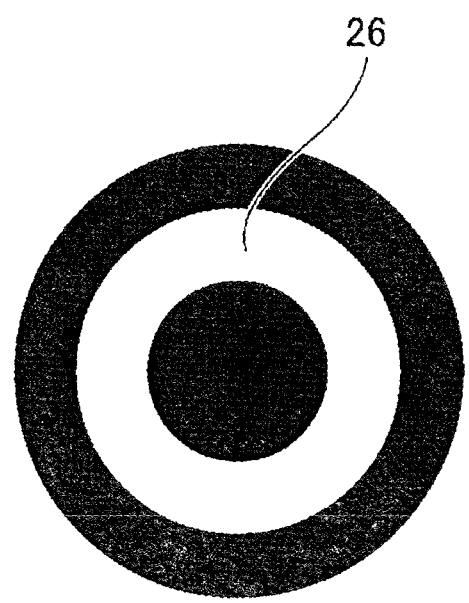
FIG. 7 is an image view illustrating a second example of the detection image in the exemplary embodiment of the present invention.

Meanwhile, the detection image 26 may be formed as a pattern of concentric circles as illustrated in FIG. 7. In this case as well, a focus deviation is detected based on a contrast of black and white concentric circles.

Figure 8:
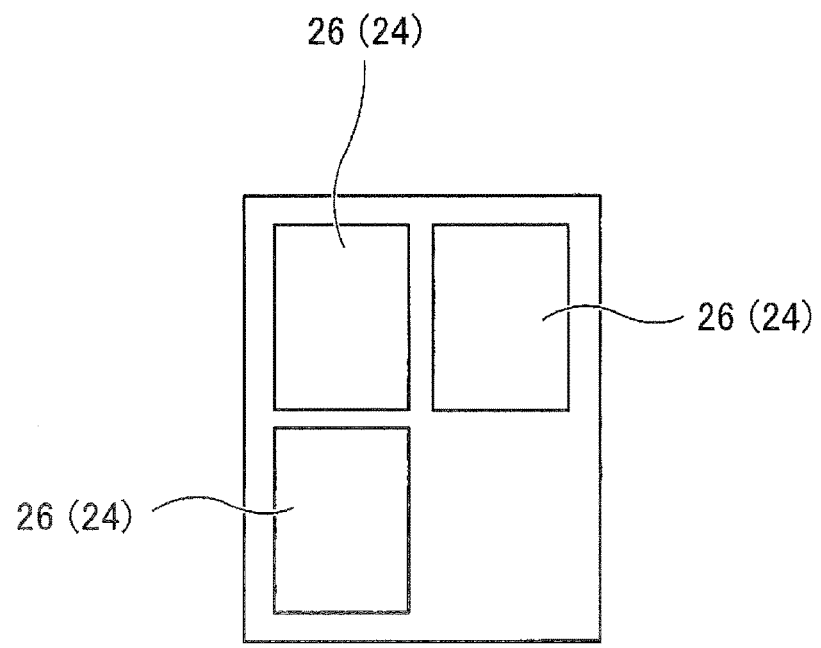
FIG. 8 is an image view illustrating a third example of the detection image in the exemplary embodiment of the present invention.

Further, as illustrated in FIG. 8, the detection image 26 may also serve as the color samples 24. In this case, a focus deviation is detected based on a blunt state of edges of the color samples 24 or a coloring on a white background portion between the color samples 24.

Figure 9:
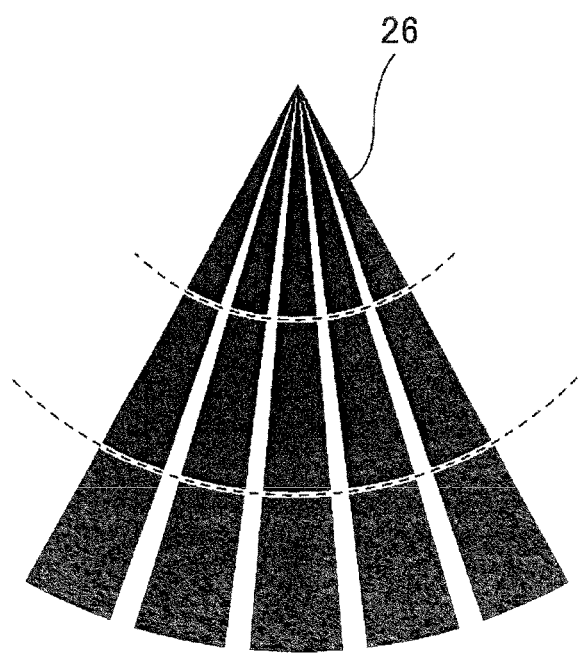
FIG. 9 is an image view illustrating a fourth example of the detection image in the exemplary embodiment of the present invention.

Further, as illustrated in FIG. 9, the detection image 26 may be a radial pattern. In this case, as indicated by dotted line in FIG. 9, a focus deviation is continuously determined based on a fill-up state of wedges.

Figure 6C:
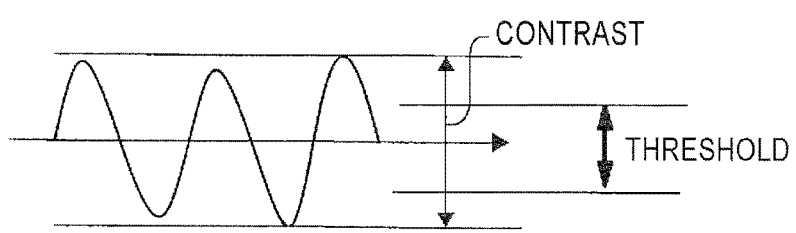
Figure 6D:
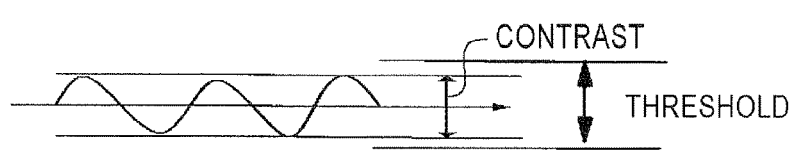

Then, in the following step S16, it is determined whether the focus deviation detected in step S14 falls within an allowable range. The determination is performed by comparing, for example, a focus deviation amount with a predetermined threshold. For example, when the focus deviation amount is caused, the contrast is reduced. As illustrated in FIG. 6C, when the contrast is reduced and is larger than a predetermined threshold, it is determined that the focus deviation falls within the allowable range. Further, when the focus deviation amount becomes larger, the contrast is more reduced. Then, as illustrated in FIG. 6D, when the contrast is smaller than the threshold, it is determined that the focus deviation exceeds the allowable range.

In step S16, when it is determined that the focus deviation falls within an allowable range, the process proceeds to step S18, and the display 52 displays a message indicating an allowable range. When it is determined that the focus deviation does not fall within the allowable range, that is, the focus deviation exceeds the allowable range, the process proceeds to step S20, the display 52 displays a message indicating an excess of an allowable range, and the process is ended.

Meanwhile, in the exemplary embodiment, in step S16, it is determined whether the focus deviation falls within an allowable range, but a user may make a determination by viewing the detection image 26 displayed on the display 52.

When it is determined that the focus deviation falls within an allowable range as described above, the object 10 is captured together with the known color body 22, and the image data obtained through capturing are sent to the processing device 20.

Figure 10:
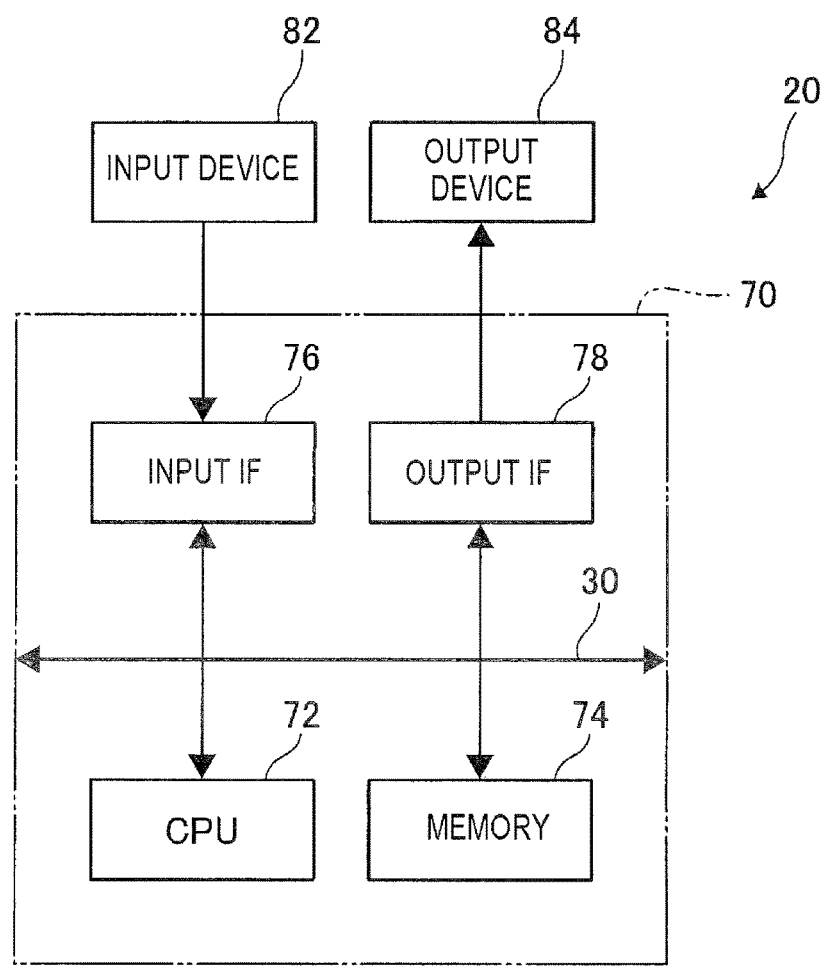
FIG. 10 is a block diagram illustrating hardware of a processing device in the exemplary embodiment of the present invention.

FIG. 10 is a block diagram illustrating the processing device 20.

The processing device 20 includes a data processor 70. The data processor 70 includes a CPU 72, a memory 74, an input interface 76, and an output interface 78, which are connected through a control bus 80.

The CPU 72 executes a predetermined processing based on a control program stored in the memory 74. An input device 82 is connected to the input interface 76. The input device 82 may include a connector that is directly connected to the image capturing device 18 to be used for input, or a device used for wireless input through a communication. Further, an output device 84 is connected to the output interface 78. The output device 84 is a display or a printer, through which a result such as processed data is output.

Figure 11:
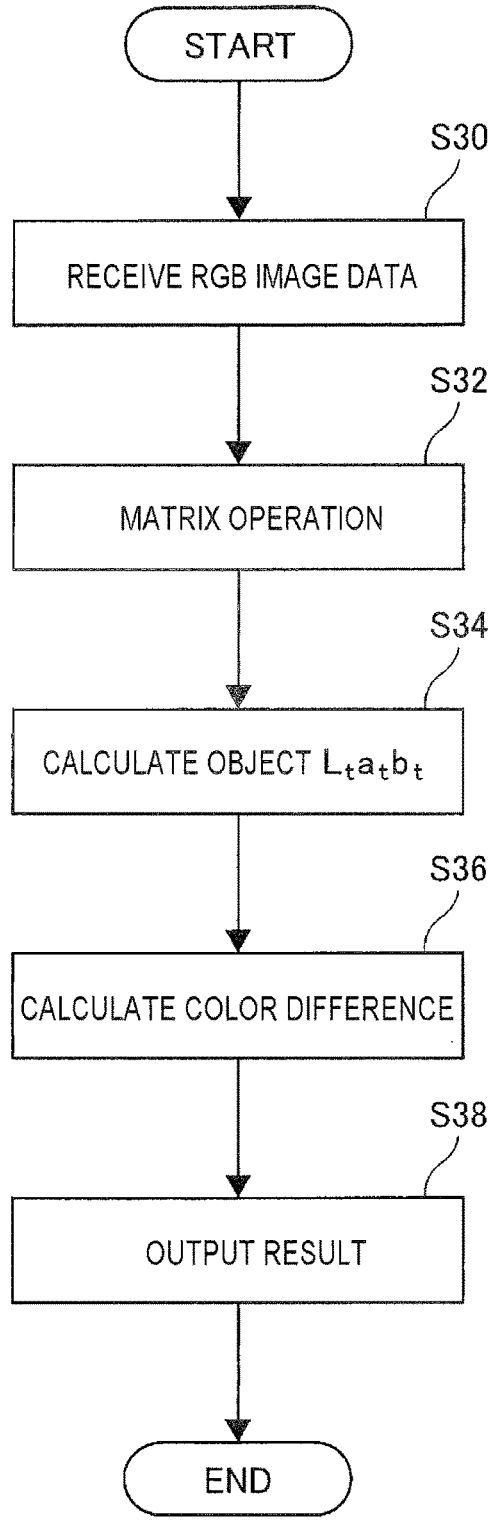
FIG. 11 is a flow chart illustrating a processing flow of the processing device in the exemplary embodiment of the present invention.

FIG. 11 is a flow chart illustrating a processing flow of the processing device 20.

First, in step S30, RGB image data of the object 10 and the known color body 22 captured by the image capturing device 18 are received.

Meanwhile, the image data of the known color body 22 to be adopted include an average value of each of RGB in a region near the center within the color sample 24 having the same color.

In the following step S32, a matrix operation is performed. That is, the RGB image data of the color samples 24 received in step S30 are set as explanatory variables, and a colorimetric value L*a*b* (hereinafter, referred to as Lab) of each of the color samples 24 obtained through colorimetry in advance and stored in the memory 74 is set as an object variable to obtain a matrix through multiple regression.

For example, as expressed in Equation (1) below, a matrix in multiple regression is obtained, and image data RGB are converted into a colorimetric value Lab.

[Equation 1]

$$^t(L,a,b) = M \cdot {}^t(R,G,B,1) \quad (t\text{: TRANSPOSED MATRIX,} \\ M \text{ IS A } 3 \times 10 \text{ MATRIX}) \tag{1}$$

Specifically, Equation (2) below is used.

[Equation 2]

$$L = (a11, a12, a13, \ldots, a110) \, {}^t(R,G,B,R^2,G^2,B^2,RG, GB,BR,1)$$

$$a = (a21, a22, a23, \ldots, a210)$$

$$b = (a31, a32, a33, \ldots, a310) \tag{2}$$

In the following step S34, the RGB data of the image (e.g., the red portion 14) of the object 10 captured by the image capturing device 18 are substituted in the equation obtained in step S32 to obtain an expected colorimetric value $L_t a_t b_t$ of the object.

Meanwhile, in the exemplary embodiment, as expressed in Equation (1), multiple regression is performed by a quadratic equation, but may be performed by a color conversion method such as a three-dimensional table method used in a general color management system instead of the quadratic equation. Further, instead of the multiple regression, a neural network by learning may be used. That is, any method may be used as long as the method is capable of forming color conversion using teacher data (data of explanatory variables and object variables).

In the following step S36, a color difference $\Delta E$ between a colorimetric value $L_0 a_0 b_0$ on the object in a new product state and a colorimetric value $L_t a_t b_t$ obtained in step S34 is calculated. As the colorimetric value $L_0 a_0 b_0$ on the new product state, a value obtained through actual colorimetry in a new product state is used.

For the calculation of the color difference $\Delta E$, for example, Equation (3) below is used.

[Equation 3]

$$\Delta E = \sqrt{(L_0-L_t)^2 + (a_0-a_t)^2 + (b_0-b_t)^2} \quad (3)$$

Meanwhile, in the example, as expressed in Equation (2), the color difference $\Delta E$ is obtained by Euclidean distance, but, for example, $\Delta E00$ or the like may be used.

Then, in the following step S38, the measured result is output to the output device 84, and the process is ended. As the measured result, $\Delta E$ calculated in step S36 may be output as it is. Meanwhile, when $\Delta E$ exceeds a predetermined threshold, a message indicating that repairing is needed may be displayed, or a deterioration level, e.g., level 1, level 2, or the like may be output.

Meanwhile, in the exemplary embodiment, the processing device 20 includes a personal computer, but the present invention is not limited thereto. For example, the image capturing device 18 may have all or some of functions of the processing device 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A change degree deriving device comprising:
   a receiving unit that receives an image obtained by capturing a known color body together with an object while focusing on the object and not on the known color body,
   the known color body including (i) a plurality of color samples, each of which has a known color numerical value, and (ii) a detection image; and
   a processor programmed to detect a focus deviation of the known color body in the image, based on a difference between (i) a current contrast level in the detection image while focusing on the object and (ii) a contrast level in the detection image while focusing on the known color body.

2. The change degree deriving device according to claim 1, wherein
   the processor is further programmed to determine whether the focus deviation falls within an allowable range.

3. A change degree deriving system comprising:
   a known color body that includes (i) a plurality of color samples, each of which has a known color numerical value, and (ii) a detection image;
   an image capturing device that captures the known color body together with an object while focusing on the object and not on the known color body; and
   a processor programmed to detect a focus deviation of the known color body in data obtained by the image capturing device, based on a difference between (i) a current contrast level in the detection image while focusing on the object and (ii) a contrast level in the detection image while focusing on the known color body.

4. The change degree deriving system according to claim 3, wherein
   the processor is further programmed to determine whether the focus deviation falls within an allowable range.

5. The change degree deriving system according to claim 3, wherein
   the processor is further programmed to
      generate a conversion rule used in conversion into a numerical value in a device-independent color space based on the plurality of color samples included in an image captured by the image capturing device, and
      convert a color of the object in the image captured by the image capturing device into a numerical value in the device-independent color space, according to the conversion rule.

6. A non-transitory computer readable medium storing a program causing a computer to execute a process for deriving change degree, the process comprising:
   receiving an image obtained by capturing a known color body together with an object while focusing on the object and not on the known color body,
   the known color body including (i) a plurality of color samples, each of which has a known color numerical value, and (ii) a detection image; and
   detecting a focus deviation of the known color body in the image, based on a difference between (i) a current contrast level in the detection image while focusing on the object and (ii) a contrast level in the detection image while focusing on the known color body.

7. The non-transitory computer readable medium according to claim 6, the process further comprising:
   determining whether the focus deviation falls within an allowable range.

* * * * *